United States Patent [19]
Rosenberg et al.

[11] Patent Number: 5,576,727
[45] Date of Patent: Nov. 19, 1996

[54] ELECTROMECHANICAL HUMAN-COMPUTER INTERFACE WITH FORCE FEEDBACK

[75] Inventors: Louis B. Rosenberg; Bernard G. Jackson, both of Mountain View, Calif.

[73] Assignee: Immersion Human Interface Corporation, San Jose, Calif.

[21] Appl. No.: 461,170

[22] Filed: Jun. 5, 1995

Related U.S. Application Data

[63] Continuation of Ser. No. 92,974, Jul. 16, 1993.
[51] Int. Cl.$^6$ .................................................. G06F 3/033
[52] U.S. Cl. ........................................ 345/179; 345/161
[58] Field of Search .................................. 345/156–158, 345/161, 184; 901/3, 4, 16; 33/1 M, 1 CC; 178/18; 400/475

[56] References Cited

U.S. PATENT DOCUMENTS

| | | |
|---|---|---|
| 2,906,179 | 9/1959 | Bower . |
| 3,531,868 | 10/1970 | Stevenson . |
| 3,890,958 | 6/1975 | Fister et al. . |
| 3,944,798 | 3/1976 | Eaton . |
| 4,477,973 | 10/1984 | Davies . |
| 4,571,834 | 2/1986 | Fraser et al. . |
| 4,593,470 | 6/1986 | Davies . |
| 4,632,341 | 12/1986 | Repperger et al. ...................... 244/230 |
| 4,638,798 | 1/1987 | Shelden et al. . |
| 4,653,011 | 3/1987 | Iwano . |
| 4,654,648 | 3/1987 | Herrington et al. ..................... 345/179 |
| 4,670,851 | 6/1987 | Murakami et al. . |
| 4,676,002 | 6/1987 | Slocum . |
| 4,679,331 | 7/1987 | Koontz . |
| 4,703,443 | 10/1987 | Moriyasu . |
| 4,750,487 | 6/1988 | Zanetti . |
| 4,769,763 | 9/1988 | Trieb et al. . |
| 4,787,051 | 11/1988 | Olson ...................................... 364/518 |
| 4,791,934 | 12/1988 | Brunnett . |

(List continued on next page.)

OTHER PUBLICATIONS

"Virtual Environment Display System", S. S. Fisher et al., ACM 1986 Worshop on Interactive Graphics.

"Foot–Operated Mouse", IBM Technical Disclosure Bulletin, vol. 28, No. 11, Apr. 1986, p. 4763.

Smith, Geoffrey, "Call It Palpable Progress," *Business Week*, Oct. 9, 1995, p. 93, 96.

Rosenberg, Louis B., *Perceptual Design of A Virtual Rigid Surface Contact*, Center for Design Research, Stanford University, Armstrong Laboratory, AL/CF–TR–1995–0029, Apr. 1993.

Kenneth Meyer et al., "Survey of Position Trackers," The Massachuetts Institute of Technology Spring 1992, vol. 1, No. 2, pp. 173–200.

Jacobsen, S. C. et al., "High Performance, High Dexterity Force Reflective Teleoperator II," ANS Topical Meeting on Robotics & Remote Systems, Albuquerque, New Mexico Feb. 24–27, 1991, pp. 1–10.

(List continued on next page.)

*Primary Examiner*—Jeffery Brier
*Attorney, Agent, or Firm*—Hickman Beyer & Weaver

[57] ABSTRACT

A method and apparatus for use with a computer for providing commands to a computer through tracked manual gestures and for providing feedback to the user through forces applied to the interface. A user manipulatable object is coupled to a mechanical linkage which is, in turn, supportable on a fixed surface. The mechanical linkage or the user manipulatable object is tracked by sensors for sensing the location and/or orientation of the object. A multi-processor system architecture is disclosed wherein a host computer system is interfaced with a dedicated microprocessor which is responsive to the output of the sensors and provides the host computer with information derived from the sensors. The host computer has an application program which responds to the information provided via the microprocessor and which can provide force-feedback commands back to the microprocessor. The force feedback is felt by a user via the user manipulatable object.

50 Claims, 9 Drawing Sheets

U.S. PATENT DOCUMENTS

| | | | |
|---|---|---|---|
| 4,800,721 | 1/1989 | Cemenska et al. | 60/393 |
| 4,819,195 | 4/1989 | Bell et al. | |
| 4,839,838 | 6/1989 | LaBiche et al. | 364/709 |
| 4,849,692 | 7/1989 | Blood . | |
| 4,879,556 | 11/1989 | Duimel | 273/438 |
| 4,888,877 | 12/1989 | Enderle et al. | |
| 4,891,889 | 1/1990 | Tomelleri . | |
| 4,907,970 | 3/1990 | Meenen, Jr. | 434/45 |
| 4,907,973 | 3/1990 | Hon | 434/262 |
| 4,942,545 | 7/1990 | Sapia . | |
| 4,945,305 | 7/1990 | Blood . | |
| 4,945,501 | 7/1990 | Bell et al. | |
| 4,961,138 | 10/1990 | Gorniak | 364/200 |
| 4,962,591 | 10/1990 | Zeller et al. | |
| 4,982,504 | 1/1991 | Söderberg et al. | |
| 5,007,085 | 4/1991 | Greanias et al. | 380/25 |
| 5,040,306 | 8/1991 | McMurtry et al. | |
| 5,050,608 | 9/1991 | Watanabe et al. | |
| 5,072,361 | 12/1991 | Davis et al. | 364/167.01 |
| 5,088,046 | 2/1992 | McMurtry . | |
| 5,088,055 | 2/1992 | Oyama . | |
| 5,095,303 | 3/1992 | Clark et al. | |
| 5,116,051 | 5/1992 | Moncrief et al. | 273/448 B |
| 5,128,671 | 7/1992 | Thomas, Jr. | 341/20 |
| 5,131,844 | 7/1992 | Marinaccio et al. | |
| 5,132,672 | 7/1992 | Clark . | |
| 5,139,261 | 8/1992 | Openiano | 273/438 |
| 5,142,506 | 8/1992 | Edwards | 367/127 |
| 5,143,505 | 9/1992 | Burdea et al. | 414/5 |
| 5,148,377 | 9/1992 | McDonald . | |
| 5,181,181 | 1/1993 | Glynn | 364/566 |
| 5,184,319 | 2/1993 | Kramer | 345/156 |
| 5,187,874 | 2/1993 | Takahashi et al. | |
| 5,189,806 | 3/1993 | McMurtry et al. | |
| 5,204,824 | 4/1993 | Fujimaki . | |
| 5,230,623 | 7/1993 | Guthrie et al. | |
| 5,251,127 | 10/1993 | Raab . | |
| 5,251,156 | 10/1993 | Heier et al. | |
| 5,259,120 | 11/1993 | Chapman et al. | |
| 5,275,565 | 1/1994 | Moncrief | 434/29 |
| 5,351,692 | 10/1994 | Dow et al. | 128/662.06 |
| 5,379,663 | 1/1995 | Hara | 345/161 |
| 5,384,460 | 1/1995 | Tseng | 250/231.14 |
| 5,389,865 | 2/1995 | Jacobus et al. | 318/568.11 |
| 5,397,323 | 3/1995 | Taylor et al. | 606/130 |
| 5,402,582 | 4/1995 | Raab . | |
| 5,417,696 | 5/1995 | Kashuba et al. | 606/9.1 |
| 5,436,542 | 7/1995 | Petelin et al. | 318/567 |
| 5,445,166 | 8/1995 | Taylor | 128/897 |
| 5,459,382 | 10/1995 | Jacobus et al. | 318/568.11 |
| 5,467,763 | 11/1995 | McMahon et al. | 600/201 |

OTHER PUBLICATIONS

Kotoku, Tetsuo et al., "Environment Modeling for the Interactive Display (EMID) Used in Telerobotic Systems," IEEE Nov. 3–5, 1991, pp. 99–1004.

Bejczy, Antal K., "The Phantom Robot: Predictive Displays for Teleoperation with Time Delay," IEEE 1990, pp. 546–550.

Buttolo, Pietro et al., "Pen–Based Force Display for Precision Manipulation in Virtual Environments," IEEE Mar. 1995, pp. 1–8.

Tan, Hong Z. et al., "Human Factors for the Design of Force–Reflecting Haptic Interfaces," Tan, Srinivasan, Eberman, & Chang, ASME WAM 1994, pp. 1–11.

Ellis, R. E. et al., "Design and Evaluasion of a High–Performance Prototype Planar Haptic Interface," ASME Dec. 3, 1993, DSC–vol. 49, pp. 55–64.

Adelstein Bernard D. et al., "A High Performance Two Degree–of –Freedom Kinesthetic Interface," Massachusetts Institute of Technology 1992, pp. 108–112.

Colgate J. Edward et al., "Implementation of Stiff Virtual Walls in Force–Reflecting Interfaces", Sep. 22, 1993.

Iwata, Hiroo et al, "Volume Haptization", IEEE 1993, pp. 16–18.

Fischer, Patrick et al., "Specification and Design of Input Devices for Teleoperation," 1990.

Burdea, Grigore et al., "Distributed Virtual Force Feedback," IEEE, May 2, 1993, pp. 25–44.

Rosenberg, Louis B., "The Use of Virtual Fixtures as Perceptual Overlays to Enhance Operator Performance in Remote Environments," Air Force Material Command, Sep. 1992, pp. 1–42.

Rosenberg, Louis B., "The Use of Virtual Fixtures to Enhance Operator Performance in Time Delayed Teleoperation", Crew Systems Directorate Biodynamics and Biocommunications Division Wright–Patterson, Air Force Material Command, Mar. 1993, pp. 1–45.

Burdea, Grigore et al., "A Portable Dextrous Master with Force Feedback," *Presence: Teleoperators and Virtual Environments*, MIT Press, Jun. 1991.

Rosenberg, Louis B. et al., "Perceptual Decoposition of Virtual Haptic Surfaces," IEEE, Oct. 1993.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Burdea, Grigore et al., "Dextrous Telerobotics with Force Feedback–An Overview,"Robotica 1991, vol. 9.

Colgate, J. Edward et al., "Implementation of Stiff Virtual Walls in Force–Reflecting Interfaces," 1993, pp. 1–9.

Yamakita, M. et al., "Tele–Virtual Reality of Dynamic Mechanical Model", IEEE Jul. 7–10, 1992, pp. 1103–1110.

Adlestein, Bernard D. et al., "Design and Implementation of a Force Reflecting Manipulandum for Manual Control Research," 1992, pp. 1–24.

Ouh–young, Ming et al., "Force Display Performs Better than Visual Display in a Simple 6–D Docking Task," IEEE 1989, pp. 1462–1466.

Kim, Won S. et al., "Graphics Displays for Operator Aid in Telemanipulation," IEEE 1991, pp. 1059–1067.

Hannaford, Blake et al., "Performance Evaluation of a Six–Axis Generalized Force–Reflecting Teleoperator," IEEE May/Jun. 1991, vol. 21, No. 3, pp. 620–633.

Kim, Won S. et al., "A Teleoperation Training Simulator with Visual and Kinesthetic Force Virtual Reality", Human Vision, Visual Proceedings, Proc. SPIE 1666, San Jose, CA, Feb. 1992.

Smith, Geoffrey, "Call It Palpable Progress," *Business Week*, Oct. 9, 1995, pp. 93, 96.

Rosenberg, Louis B., *Perceptual Design of A Virtual Rigid Surface Contact*, Center for Design Research, Stanford University, Armstrong Laboratory, AL/CF–TR–1995–0029, Apr. 1993.

Ouh–young, Ming et al., "Using a Manipulator for Force Display in Molecular Docking," IEEE 1988, pp. 1824–1829.

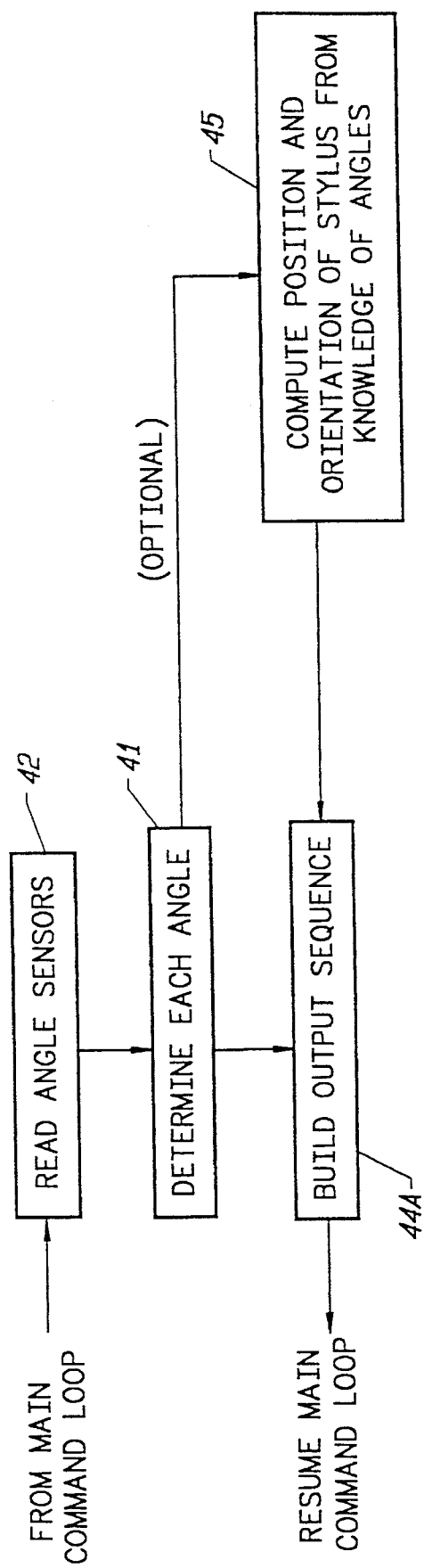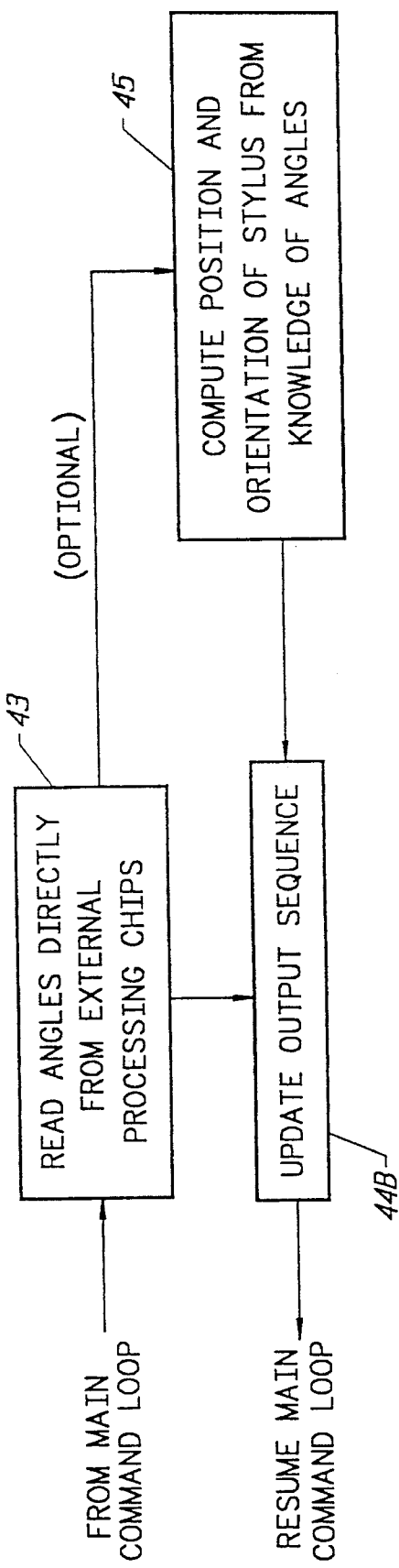
FIG. 4B
FIG. 4A

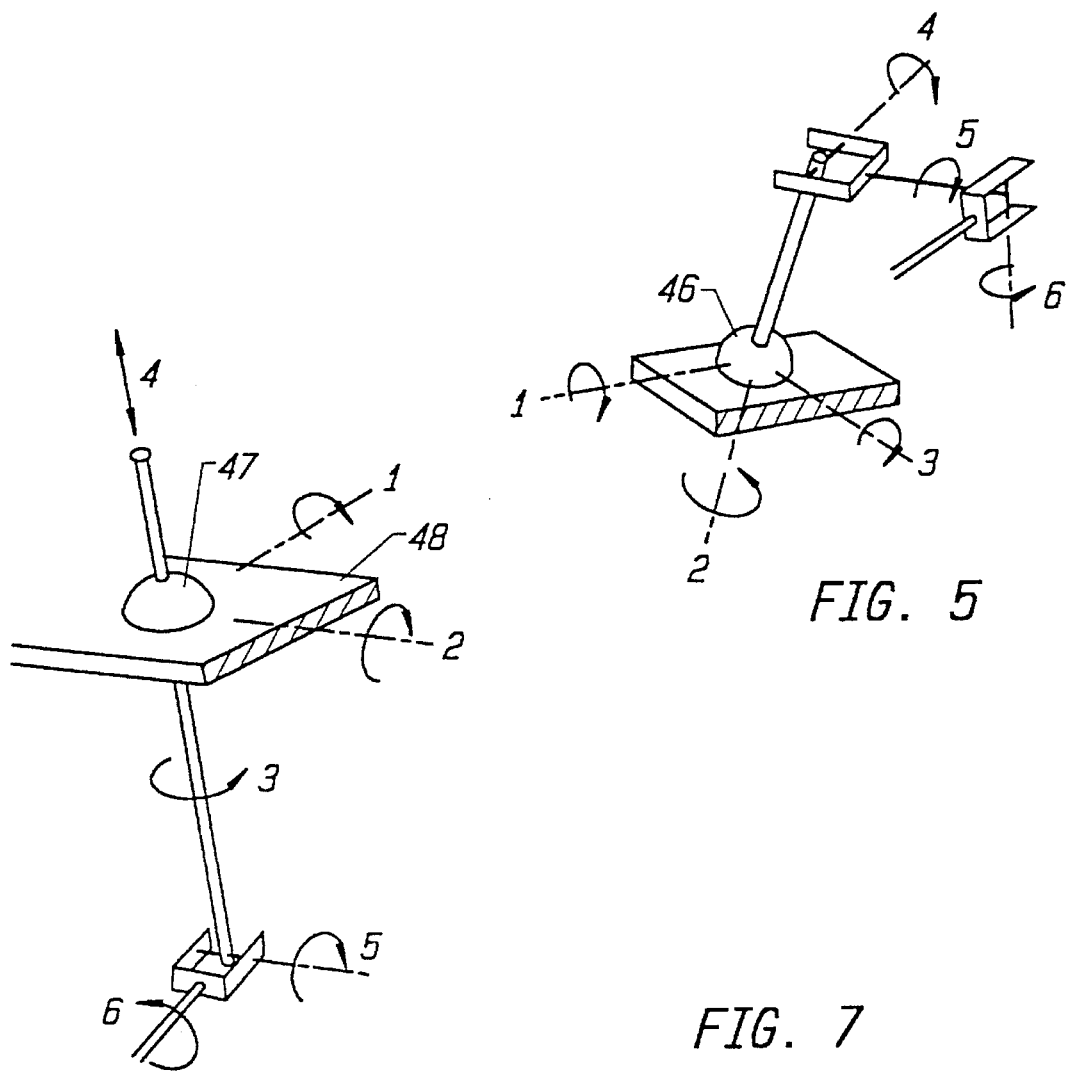
FIG. 5
FIG. 6
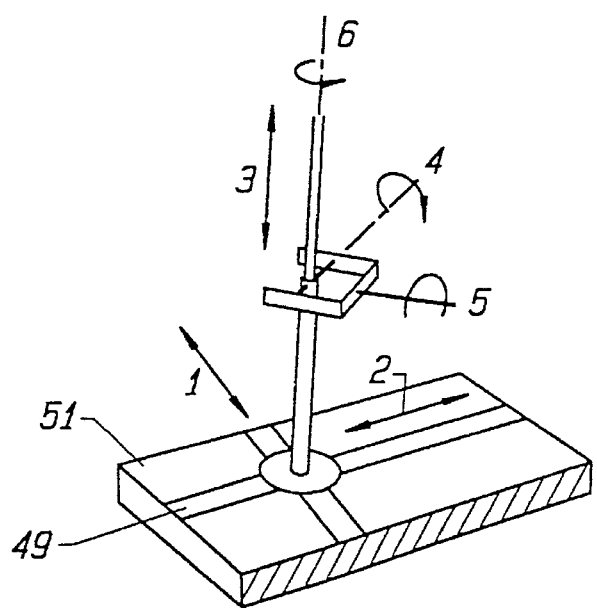
FIG. 7

ELECTROMECHANICAL HUMAN-COMPUTER INTERFACE WITH FORCE FEEDBACK

This is a continuation of application Ser. No. 08/092,974, filed Jul. 16, 1993.

FIELD OF THE INVENTION

The present invention relates to a computer-human interface device, and more particularly it relates to a stylus coupled to a supportable mechanical linkage for providing and receiving commands to and from a computer.

BACKGROUND OF THE INVENTION

As the use of Computer Aided Design (CAD) Systems becomes more widespread, the need for cursor and command control devices which accurately and easily track three-dimensional position or motion is also growing. Devices which allow users to control a cursor with three-dimensional position and/or orientation commands are available for various applications. Among them are many hand-held input devices which allow users to interact with a host processor by controlling the position of a cursor or manipulating graphic objects on a computer screen. While these devices allow three-dimensional information to be transmitted to a computer they do not allow the user to use gestures and motions which are natural to the user.

For example, a prior art device of the type which is used for three-dimensional control involves the use of accelerometers to transduce the position and orientation of a stylus in space as described in U.S. Pat. No. 4,839,838. This device makes no provisions so the stylus can be grasped in a manner which makes use of finger dexterity nor does it include mechanical support to reduce fatigue or enhance user control or dexterity.

Another prior art example is an ultrasonic position-locating device like the one shown in U.S. Pat. No. 5,142,506. This device transduces position and orientation by triangulating ultrasonic signals. As with the prior art previously described, this device uses a free-floating stylus which includes no provisions for mechanical support to reduce fatigue or enhance user control or dexterity. Furthermore, this device is used with a stylus that is grasped in the palm of the hand. The use of such a stylus precludes fine positioning with the fingers and greatly reduces the dexterity of the user to manipulate position and orientation. In addition, this device is used with digital buttons on the stylus to send to the computer command signals. A button of this type is commonly called a "clicker" on a "mouse." Because such buttons are mechanically coupled to the free-floating stylus, it is difficult to push the buttons while maintaining the position and orientation of the stylus. By pushing down on the button, the user will necessarily move the stylus from its desired position. Accordingly, these commands are difficult to control under many circumstances.

SUMMARY OF THE INVENTION

In the present invention, the user holds a stylus which is supported by a support apparatus on a fixed surface so that the user can easily manipulate the stylus in free space to interact with a computer. The three-dimensional motion of the user is translated through the stylus and mechanical linkage to a processor which communicates with the computer, thus allowing commands to be sent to the computer which track the three-dimensional motion of the user. Therefore, cursor control in three-dimensions on the two-dimensional computer screen is possible.

In one embodiment, the stylus is supportable on a fixed surface by a set of mechanical linkages which include individual components joined together by a sufficient number of joints to allow several degrees of freedom in the motion of the stylus. These mechanical linkages provide mechanical leverage, friction, counter-weighing, and/or spring resistance in order to reduce fatigue of the user and to provide support to enhance the stability and dexterity of user manipulation of the stylus.

In the aforementioned embodiment of the present invention, the joints of the mechanical linkages are coupled to sensors which provide information about their position. Such information is transmitted to a microprocessor so that position and orientation of the stylus can be computed using kinematic equations associated with or related to the particular linkage system. In another embodiment, position and orientation of the stylus is sensed through the use of ultrasonic, magnetic, or optical position and orientation sensors mounted on the stylus.

An embodiment of the present invention includes computer software and hardware which will provide force feedback information from the computer to the stylus. The computer sends feedback signals to the mechanical linkage which has force generators for generating force in response to images depicted on the computer screen. Incoming commands from the host computer are monitored by the microprocessor and instruct the microprocessor to report forces felt by a joint or set forces on a joint of the mechanical linkage.

Another aspect of the present invention includes a remote control unit which is used in place of a command clicker on the stylus. For example, a foot pedal or hand-held unit for the user's opposite hand is included to provide command control to the computer. Accordingly, manual dexterity of stylus manipulation is not compromised.

DESCRIPTION OF THE DRAWINGS

FIGS. 4A and 4B are flow charts describing two different interrupt service routines for serial output to host computer;

FIG. 5 is a perspective representation of another embodiment of the present invention;

FIG. 6 is a perspective view of still another embodiment of the present invention;

FIG. 7 is a perspective representation of another embodiment;

DESCRIPTION OF PREFERRED EMBODIMENTS

Figure 1:
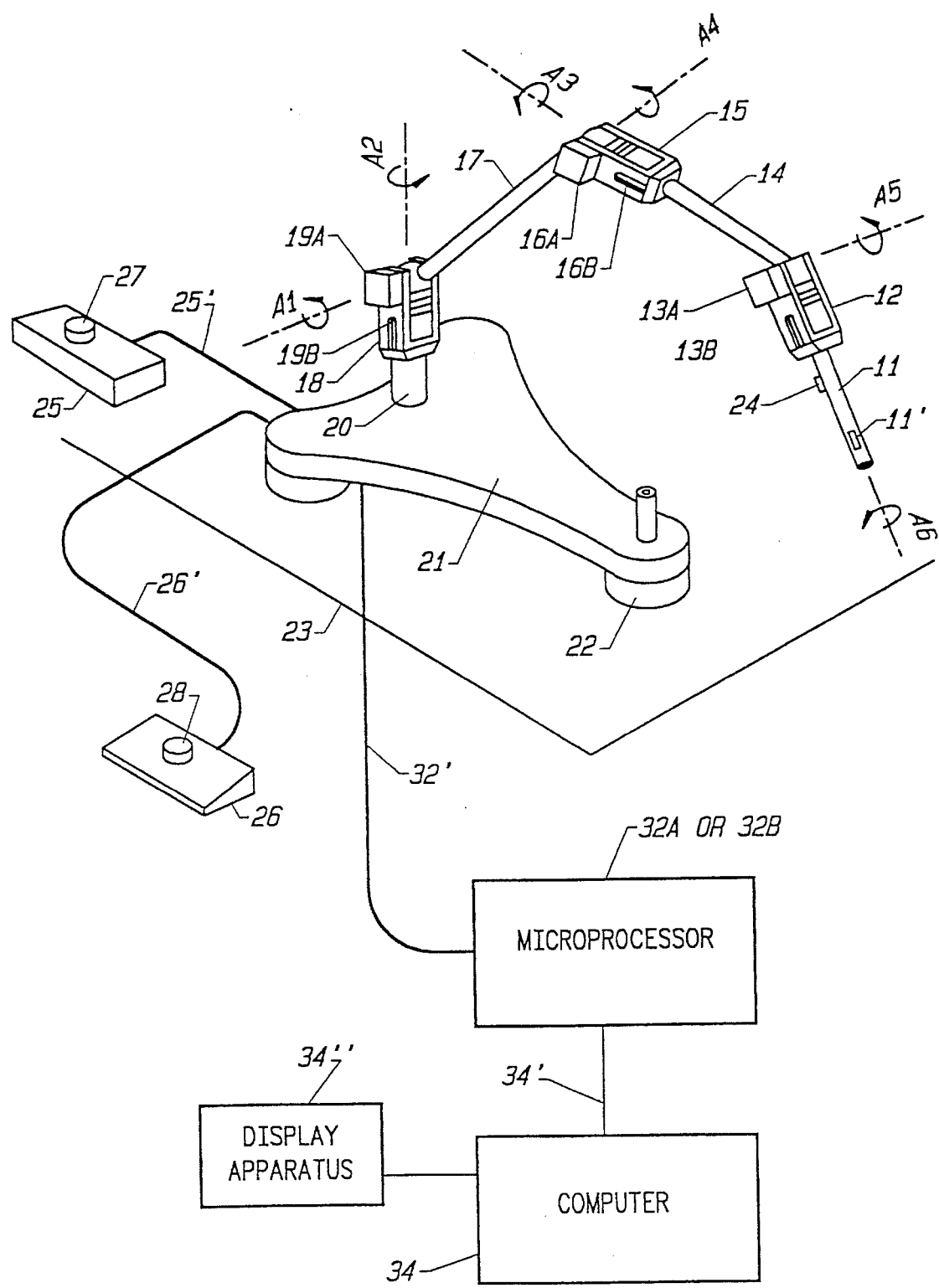
FIG. 1 is a perspective view of an embodiment of the present invention.

Referring to FIG. 1, a stylus 11 is shown attached to a support apparatus which is, in turn, supported on a fixed surface. By electrical and electronic configurations described below, the stylus 11 is adapted to provide data from which a computer or other computing means such as a microprocessor can ascertain the position and orientation of the stylus as it moves in three-dimensional space. This information is then translated to an image on a computer display apparatus. The stylus 11 may be used, for example, by an operator to change the position of a cursor on a computer controlled display screen by changing the position and/or orientation of the stylus, the computer being programmed to change the position of the cursor in proportion to the change in position and/or orientation of the stylus. In other words, the stylus 11 is moved through space by the user to designate to the computer how or where to move the cursor on a computer display apparatus.

Also contemplated in the present invention is computer software and hardware which will provide feedback information from the computer to the stylus and cause forces on the stylus. This implementation is described in greater detail subsequently.

The stylus 11 is a pen-like stick which can be manipulated between the fingers, allowing for much better control and fine dexterity as compared to full hand grips or palm-supported styluses used by some prior art inventions. While the stylus 11 is described in terms of manual manipulation, other stylus configurations are envisioned by the present invention. In particular, this invention includes manipulation by those unable to manually manipulate a pen. A stylus of the present invention, need not be linear, but may be curved or angled so that it may be held, for example, by the foot or the mouth of a person.

Because the stylus is supported by a support apparatus which is in turn supported by a fixed surface or other stabilizing configuration, the user can manipulate the stylus with a minimum of effort. Also, if the user chooses to discontinue using the stylus, it is capable of maintaining its position in space, unattended. While FIG. 1 shows that preferred embodiment of the present invention, FIGS. 5–8 show alternative embodiments, such which are also contemplated under the present invention. It is preferable that the stylus have enough degrees of freedom to enable it to move through the mechanical linkage to give the user the amount of flexibility needed to move the cursor as desired. In FIG. 1, six degrees of freedom are shown and are labeled as Axis' 16. This, of course, provides maximum flexibility. Fewer degrees of freedom, such as a plurality of degrees of freedom, may also be sufficient depending on the application.

In one embodiment, the stylus is connected to rigid individual components which are joined together by joints. While not shown, other types of support apparatus' are included in the present invention. For example, other configurations include a semi-flexible rod or any other moveable while supportive configuration which can support the stylus in the manner described herein.

In FIG. 1, a mechanical linkage pursuant to the present invention is depicted. The stylus 11 is coupled to supportable mechanical linkages via joint 12 which, in the shown embodiment, houses sensors 13A and 13B. Linkage 14, is connected, via joint 15 having position sensors 16A and 16B, to linkage 17. Joint 18 in turn connects linkage 17 with the vertical base protrusion 20 which emanates from the base 21. The sensors are used to produce a stylus locative signal which is responsive to and corresponds with the position of the stylus at any point in time during its normal operation. The stylus locative signal is used to provide information for use by a computer display apparatus of a computer. The term "joint" as used herein is intended to mean the connection mechanism between individual linkage components. In fact, two separate moveable members can be joined; such together forming a joint.

The base 21, if necessarily, can be immobilized by securing it onto the fixed surface 23 by way of bolt, screw or other attachment mechanism 22. Moreover, the present invention implements mechanical leverage and rubbing friction (not shown) between the supportable mechanical linkages 14 and 17 and the joints 12, 15 and 18 in order to provide resistance and support so as to allow better dexterity than can be achieved with free-floating stylus trackers. This support and leverage aids in reducing the fatigue associated with manipulating the free-floating stylus 11.

As mentioned above, attached to each joint 12, 15 and 18 are sensors 13A, 13B, 16A, 16B, 19A, and 19B, respectively. These sensors sense the angle differential before and after motion of the two segments connected by that joint. The sensors can be, for example, optical incremental encoders, optical absolute encoders and potentiometers. Because the three-dimensional position and/or orientation tracking is achieved mechanically, this preferred embodiment avoids problems that magnetic and ultrasonic sensors, such as those shown in the prior art, encounter with metal and shadowing. However, as shown in FIG. 1, if desired, sensing means can be used to track the position and/or orientation of the stylus by mounting a single or several orientation sensors in the stylus 11 itself, such referred to as a stylus mounted sensor 11'. An ultrasound, magnetic, optical or position and orientation sensor can be used as the stylus mounted sensor 11'.

FIG. 1 also shows a clicker button 24 on stylus 11. The button is connected to a switch which when in the on state, sends a signal to the computer giving it a command. In order to provide for accuracy when sending commands, this invention also includes a remote clicker unit. Therefore, since the clicking motion occurs at a distant location from the cursor control, there is little or no opportunity to accidently move the cursor while making a command. FIG. 1 shows two configurations for implementing this aspect of the present invention. The first is identified as an alternate hand-clicker 25, the second as foot pedal 26.

Digital buttons 27 and 28 which are connected to switches (not shown) on the remote attached peripherals such as a hand-held clicker unit 25 or a foot pedal 26, respectively, can generate additional digital input such transmitted through lines 25' and 26' respectively. Either of the shown ancillary remote command units, such including the hand unit 25 and the foot pedal 26 configurations, are favorable methods of inputting digital commands by command hardware or software (not shown) because pressing the button 27 or 28 does not compromise a user's ability to hold the stylus steady whereas pressing any button 24 on the stylus does compromise stylus stability.

Figure 2A:
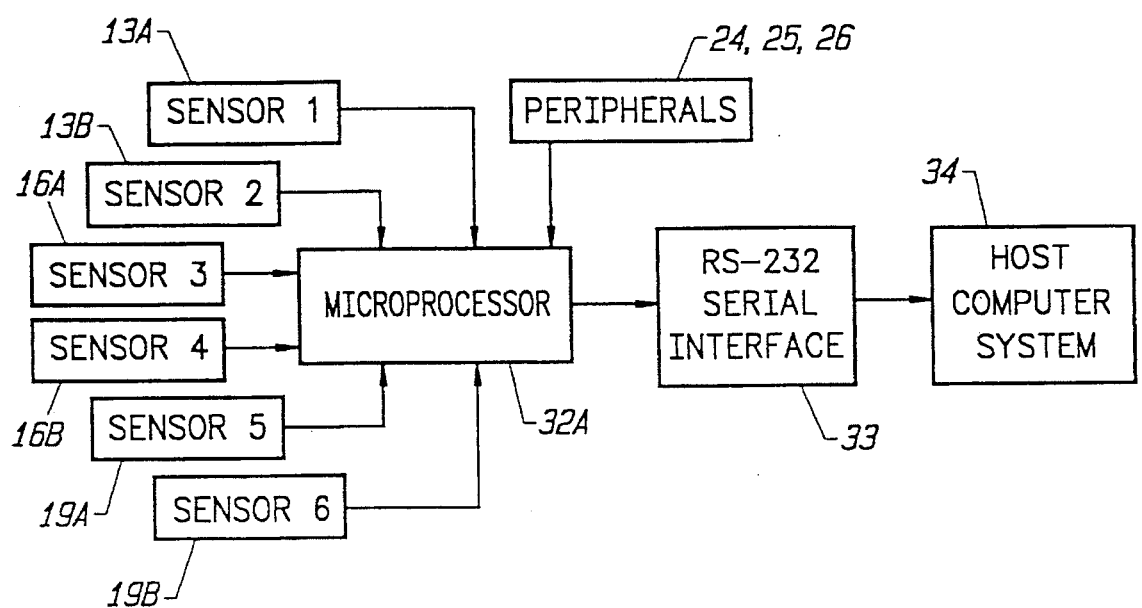
FIGS. 2A and 2B are block diagrams over-viewing two different electronic hardware configurations of the present invention.
Figure 2B:
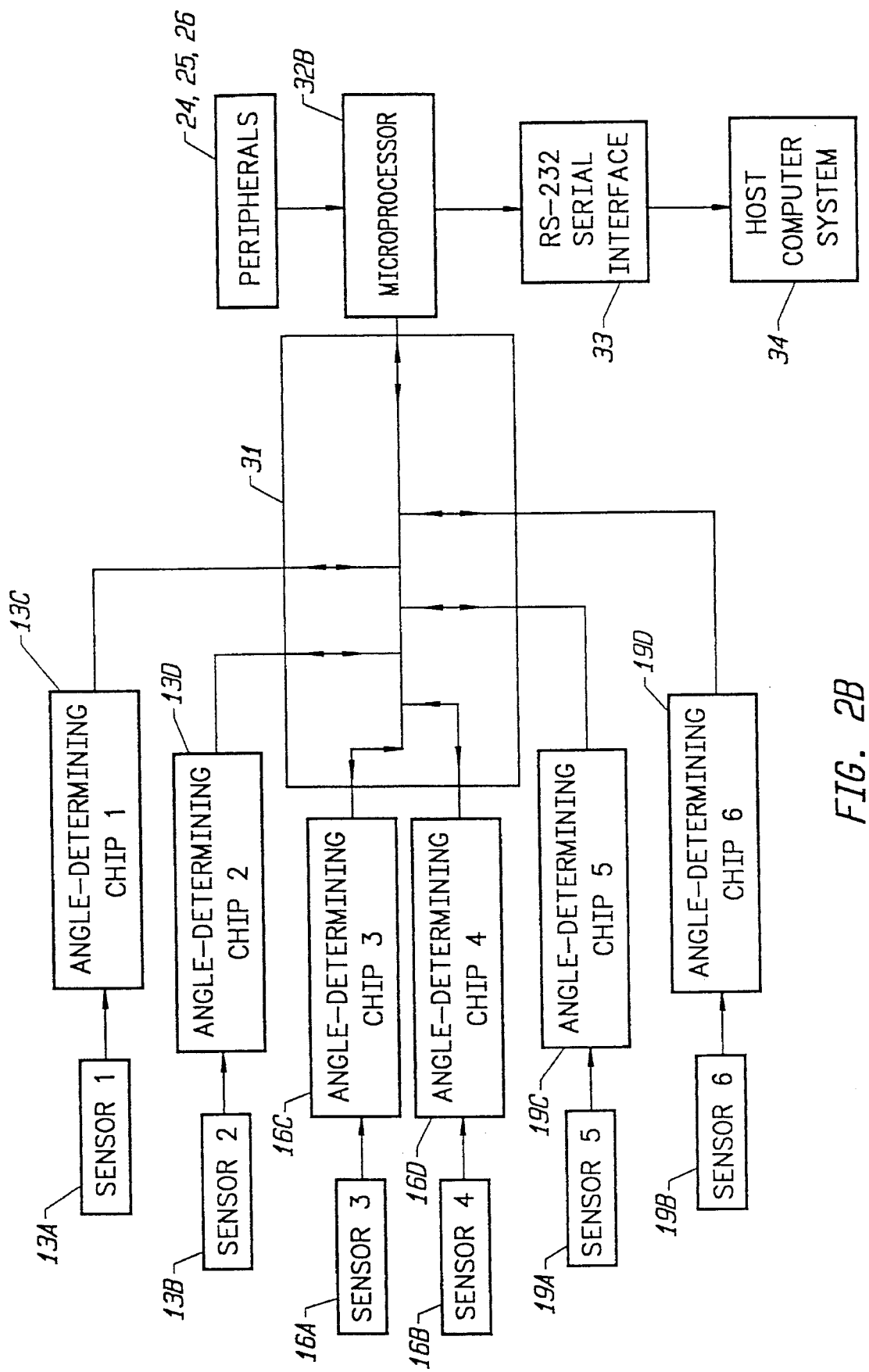

Referring to FIG. 2A, the sensors 13A, 13B, 16A, 16B, 19A and 19B, along with any peripherals 24, 25 or 26, can send their digital signals directly to a versatile floating-point processor or microprocessor 32A which is controlled by software stored in a digital ROM (Read-Only Memory) via transmission line 32' or another form of transmission, i.e., radio signals. As shown in FIG. 2B, an alternative embodiment can be used to lessen the demands on the floating-point processor or microprocessor 32B. The digital inputs of the sensors 13A, 13B, 16A, 16B, 19A and 19B can be sent indirectly to the floating-point processor or microprocessor 32B by way of dedicated chips 13C, 13D, 16C, 16D, 19C and 19D, which pre-process the angle sensors' signals before sending them via bus 31 to the floating-point processor or microprocessor 32B which would combine these signals with those from the peripherals 24, 25 or 26. An 8-bit data bus plus chip-enable lines allow any of the angle determining chips to communicate with the microprocessor. Moreover, reporting the status of peripherals 24, 25 or 26 includes reading the appropriate digital switch and placing its status in the output sequence array. Some examples of specific electronic hardware usable for sensor pre-processing include quadrature counters, which are common dedicated chips that continually read the output of an optical incremental encoder and determine an angle from it, Gray decoders, filters, and ROM look-up tables.

The single-chip configuration of FIG. 2A is most applicable where the angle sensors 13A, 13B, 16A, 16B, 19A and 19B are absolute sensors, which have output signals directly indicating the angles without any further processing, thereby requiring less computation for the microprocessor 32A and thus little if any pre-processing. The multi-chip configuration of FIG. 2B is most applicable if the sensors 13A, 13B, 16A, 16B, 19A and 19B are relative sensors, which indicate only the change in an angle and which require further processing for complete determination of the angle.

In either configuration, if the microprocessor 32A or 32B is fast enough, it will compute stylus 11 position and/or orientation (or motion, if desired) on board the embodiment and send this final data through any standard communications interface such as an RS-232 serial interface 33 on to the host computer system 34 and to computer display apparatus 34" through transmission line 34' or another form of transmission. If the microprocessor 32A or 32B is not fast enough, then the angles will be sent to the host computer 34 which will perform these calculations on its own.

In addition to the single-chip and multi-chip configurations, a variation may consist of a single microprocessor which reads the peripherals, obtains the angles, possibly computes coordinates and orientation of the stylus 11, and supervises communication with the host computer 34. Another variation may consist of dedicated subcircuits and specialized or off-the-shelf chips which reads the peripherals, monitors the angle sensors 13A, 13B, 16A, 16B, 19A and 19B, determine the joint angles, and handle communications with the host computer 34, all without software or a microprocessor 32A or 32B.

Software is only included in the two microprocessor-based configurations shown in FIGS. 2A and 2B. The more dedicated hardware a given configuration includes, the less software it requires. The software consists of a main loop (FIG. 3) and an output interrupt (FIGS. 4A and 4B).

Figure 3:
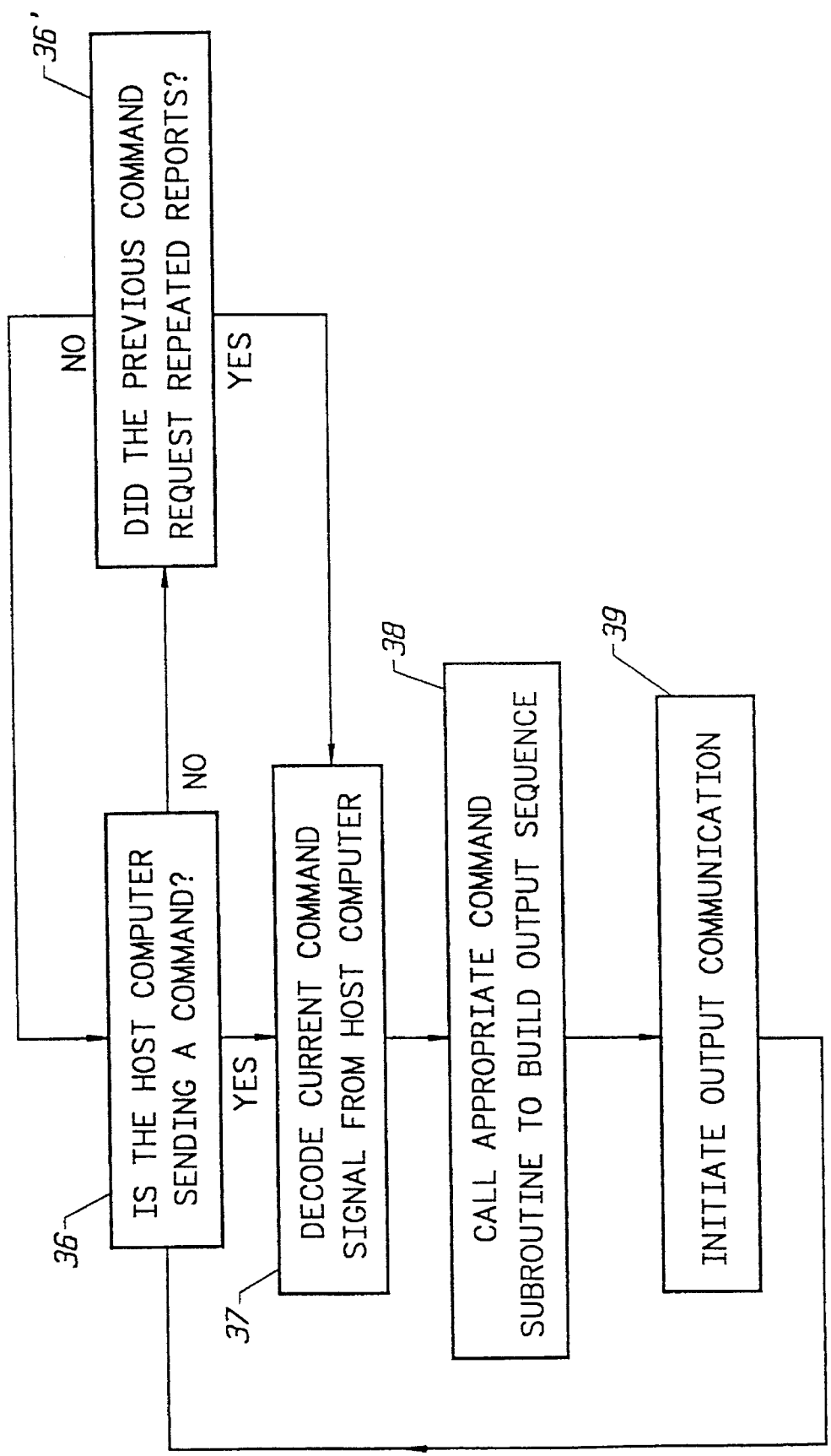
FIG. 3 is a flow chart describing the main software loop for two different electronic hardware configurations shown in FIG. 2.

Referring to FIG. 3, the main command loop responds to the host computer 34 and runs repeatedly in an endless cycle. With each cycle, incoming commands from the host computer are monitored 36 and decoded 37, and the corresponding command subroutines for reporting angles, thus stylus position and/or orientation (see FIGS. 4A and 4B), are then executed 38. Two possible subroutines are shown in FIGS. 4A and 4B. When a subroutine terminates, the main command loop resumes 39. Available command will include but are not limited to: reporting the value of any single angle, reporting the angles of all six angles at one time, reporting the values of all six angles repeatedly until a command is given to cease aforementioned repeated reporting, reporting the status of peripheral buttons, and setting communications parameters. If the angle sensors require preprocessing, these commands will also include resetting the angle value of any single angle or otherwise modifying preprocessing parameters in other applicable ways. Resetting pre-processed angle values or preprocessing parameters does not require output data from the device. The microprocessor 32A or 32B simply sends appropriate control signals to the preprocessing hardware 13C, 13D, 16C, 16D, 19C, and 19D. If the microprocessor or floating-point processor is fast enough to compute stylus coordinates and orientation, these commands will also include reporting the stylus coordinates once, reporting the stylus coordinates repeatedly until a command is given to cease, ceasing aforementioned repeated reporting, reporting the stylus coordinates and orientation once, reporting the stylus coordinates and orientation repeatedly until a command is given to cease and, ceasing aforementioned repeated reporting. If force reflection is supported, these commands will also include reporting the forces felt by any single joint, setting the resistance of any single joint, and locking or unlocking a joint.

Any report by the subroutines of FIGS. 4A and 4B of a single angle value requires determining 41 the given joint angle. For the single-chip configuration shown in FIG. 2A, this subroutine directly reads the appropriate angle sensor 42 from among sensors 13A, 13B, 16A, 16B, 19A, and 19B. For the multi-chip configuration shown in FIG. 2B, this subroutine reads the outputs 43 of pre-processing hardware 13C, 13D, 16C, 16D, 19C, and 19D which have already determined the joint angles from the outputs of the sensors 13A, 13B, 16A, 16B, 19A, and 19B. Any report of multiple angles is accomplished by repeatedly executing the subroutine for reporting a single angle. The subroutine is executed once per angle, and the values of all angles are then included in the output sequence array. If the optional parts of the subroutines 45 are included, then these subroutines become the coordinate reporting subroutines. Many other command subroutines exist and are simpler yet in their high-level structure.

After determining the given joint angle, the microprocessor 32A or 32B creates an output sequence 44A or 44B by assembling an array in a designated area of processor memory which will be output by the microprocessor's communications system at a given regular communications rate. The sequence will contain enough information for the host computer 34 to deduce which command is being responded to, as well as the actual angle value that was requested. Returning to FIG. 3, a query 36 in the main command loop asks whether the previous command requested repeated reports. If so, the main command loop is initiated accordingly. The communications output process (not shown) may be as simple as storing the output data in a designated output buffer, or it may involve a standard set of communications interrupts that are an additional part of the software. Setting communications parameters does not require output data from the device. The microprocessor 31A or 31B simply resets some of its own internal registers or sends control signals to its communications sub-unit.

To report the stylus' 11 coordinates, three of the five or six angle values pre-read and knowledge of link lengths and device kinematics are incorporated to compute stylus 11 coordinates. These coordinates are then assembled in the output sequence array.

To report the stylus' 11 orientation, at least five angle values are read and knowledge of link lengths and device kinematics are incorporated to computer stylus 11 orientation. The orientation consists of three angles (not necessarily identical to any joint angles) which are included in the output sequence array.

Forces felt by a joint are reported, and, setting a joint's resistance and locking or unlocking a joint are accomplished by using interaction of the microprocessor 32A or 32B with force-reflecting hardware. Reporting forces felt by a joint uses a force sensor mounted on the joint and then places the resulting value in the output sequence array. To set a joint's resistance and lock or unlock a joint, control signals are used to command force-reflection hardware, and do not require any output data from the device to the host computer.

Also contemplated in the present invention is computer software and hardware which will provide feedback information from the computer to the stylus. This type of implementation is known in robotics and thus is easily incorporated into a system including the present invention. When a surface is generated on the computer screen, the computer will send feedback signals to the mechanical linkage which has force generators identified by numerals 13A, 13B, 16A, 16B, 19A and 19B (which also identifies the sensors, see above) for generating force in response to the cursor position on the surface depicted on the computer screen. Force is applied for example, by added tension in the joints which is in proportion to the force being applied by the user and in conjunction with the image on the screen.

Figure 8:
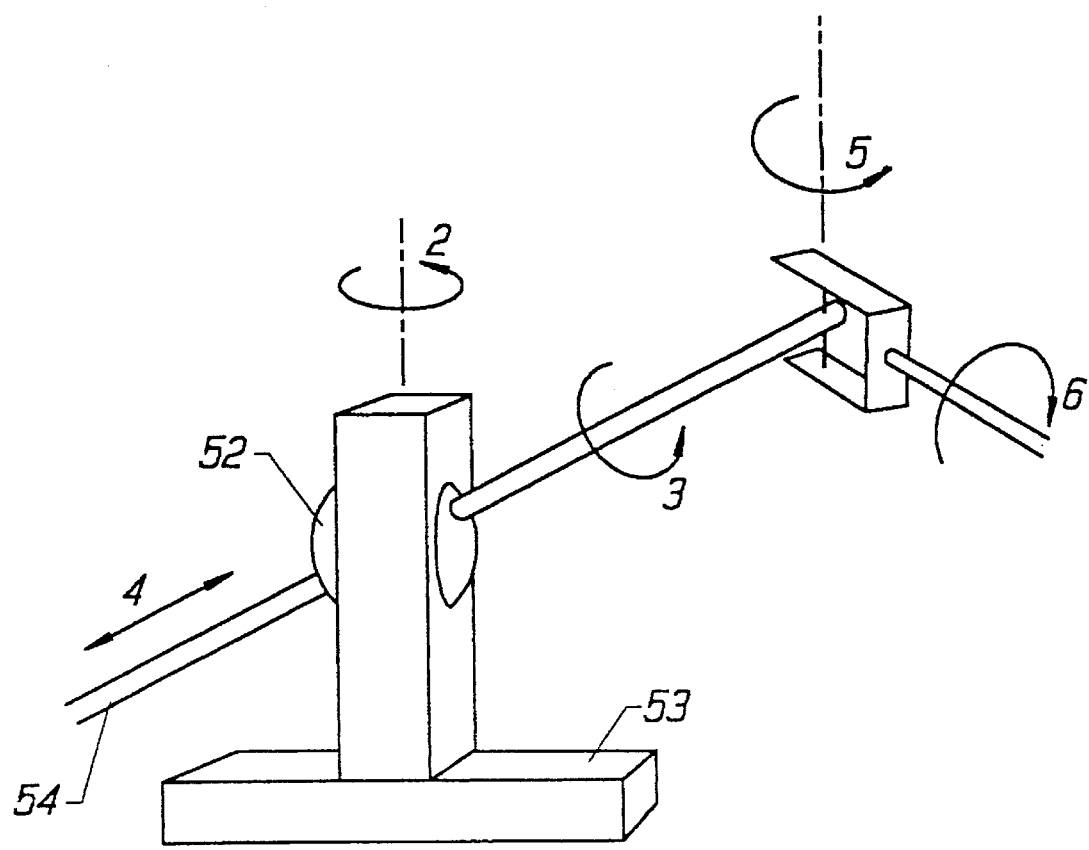
FIG. 8 is a perspective view of another embodiment.

The various configurations of the mechanical linkages shown in FIG. 5, FIG. 6, FIG. 7 and FIG. 8 which have different numbers of individual components and joints than shown in FIG. 1 are illustrative of the numerous possible configurations which can provide varying degrees of freedom inherent in the present invention. Referring to FIG. 5, FIG. 6 and FIG. 8, note that a rounded object such as a ball can act as a joint having motion in three degrees of freedom. In conjunction with other mechanical linkages and attachments, this permits sufficient degrees of freedom for the purposes of the present invention. In each figure, the orientation of the degrees of freedom of each joint is depicted by curved lines, numbered consecutively.

Briefly, FIG. 5 shows a rounded joint 46 at the base such that three degrees of motion are available at that joint. FIG. 6 shows a three-dimensionally rotatable rounded joint 47 at the base through which one mechanical linkage can slide linearly and where the base is attached to a fixed surface 48 such that the surface does not prohibitively impede the movement of the device. FIG. 7 shows an embodiment where the basal connection can slide about the base in a two-dimensional plane in the cross configuration 49 on base 51. FIG. 8 shows a three-dimensionally rotatable rounded joint 52 at a perpendicular projection from the base 53 through which one mechanical linkage 54 can slide linearly through the joint 52.

Figure 9:
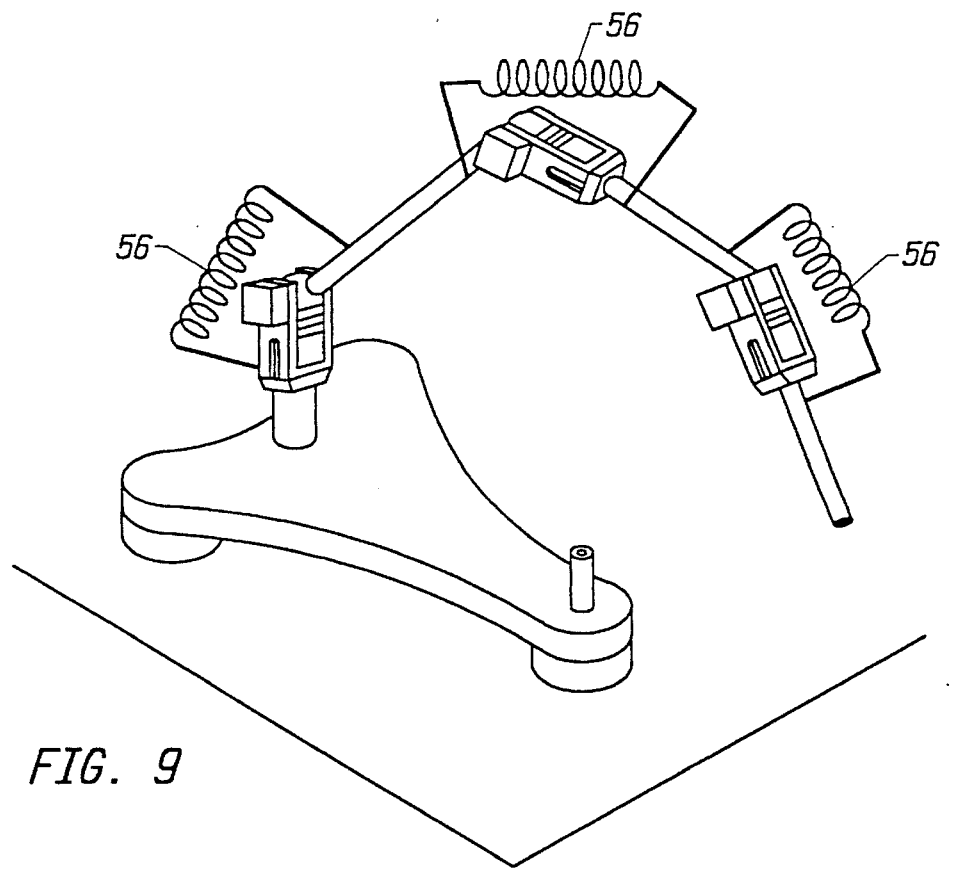
FIG. 9 shows an embodiment of the resistance mechanism of the present invention.
Figure 10:
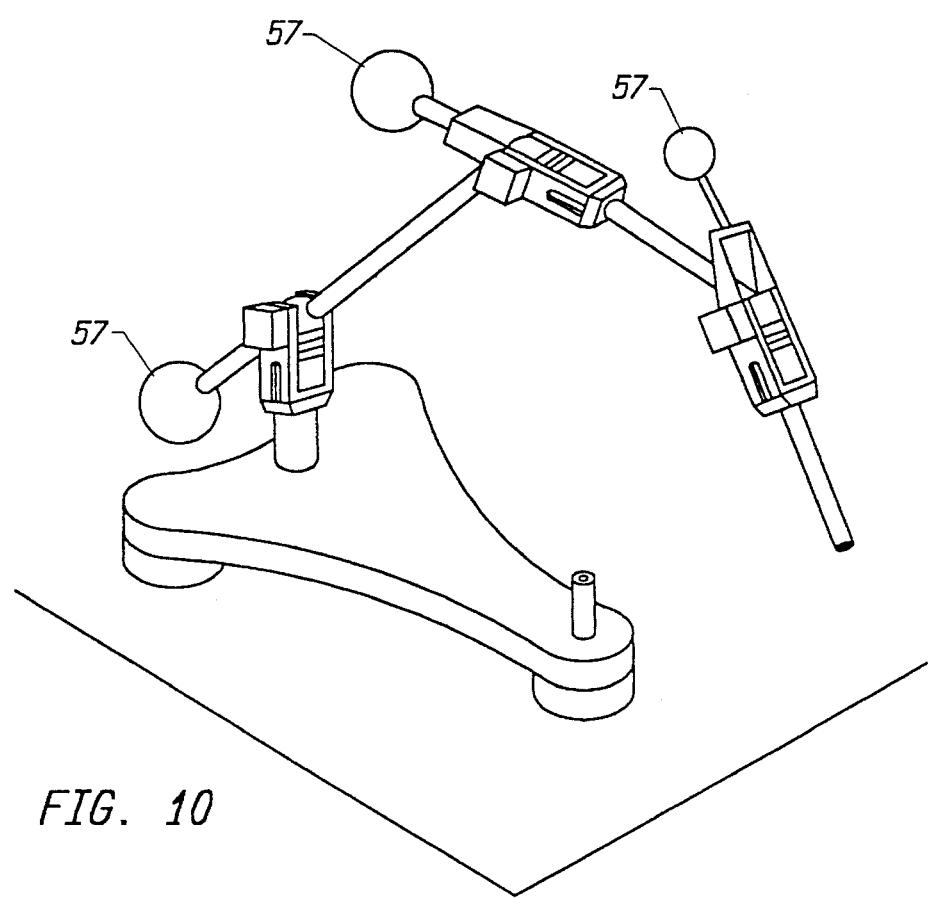
FIG. 10 shows another embodiment of the resistance mechanism.
Figure 11:
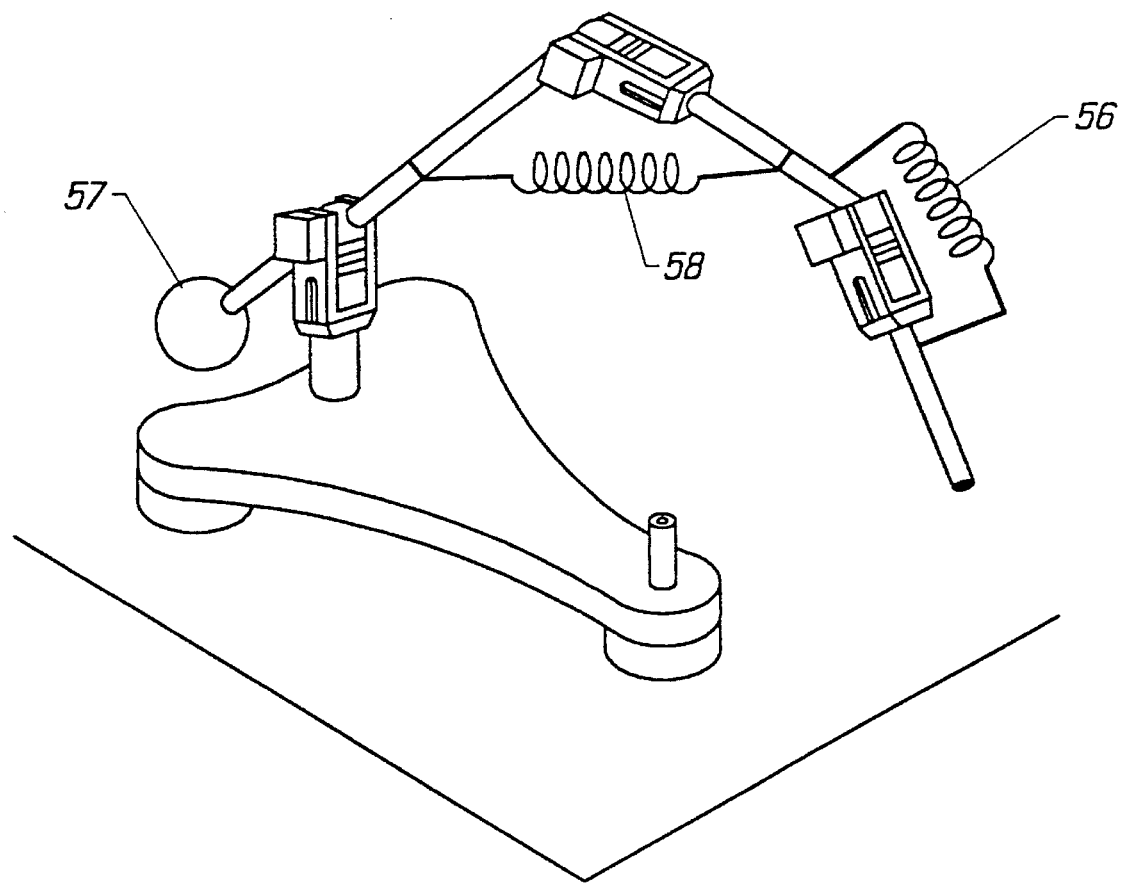
FIG. 11 shows yet another embodiment of the resistance mechanism.

While any of the above discussed configurations or others can be used in accordance with the present invention, FIGS. 9–11 show different mechanisms for providing resistance to the manual manipulation of the stylus by the user. FIG. 9, for example, shows return or tension springs 56 on each joint of the embodiment shown in FIG. 1. In an alternative embodiment, FIG. 10, shows counter-weights 57 on each joint. Moreover, FIG. 11, shows a combination of a return or tension spring 56, a counter-weight 57 and a compression spring 58. The arrangement of the resistance mechanism used should depend upon the configuration stylus mechanical linkage combination, such arrangement preferably chosen to maximize the ease with which the user can manipulate the stylus 11 in free space in accordance with the present invention.

What is claimed:

1. An interactive device for use in conjunction with a host computer, images displayed on a computer display screen, and a fixed surface, comprising:

a stylus having a pencil-like configuration to allow writing-like manipulations between fingers of a user;

a mechanical linkage coupled to a fixed surface and coupled to said stylus for supporting said stylus while allowing at least five degrees of freedom in the motion of said stylus, said mechanical linkage providing a user the ability to manipulate both the orientation and location of said stylus in three-dimensional space; and a sensor for producing an interactive stylus locative signal which is responsive to and corresponding with the position and movement of the stylus at any point in time during its normal operation, said stylus locative signal providing information about the orientation, location, and movement of said stylus for use by said host computer and said computer display screen to manipulate images displayed by said computer display screen in accordance with said orientation, location, or movement of said stylus, said images including a cursor whose position on said computer display screen is controlled by said stylus locative signal; and a force generator for generating a force on said stylus in at least one of said five degrees of freedom in response to force signals provided to said interactive device, said force signals correlated to information displayed on said computer display screen.

2. A device as recited in claim 1 further comprising:

a remote unit having a switch capable of being in an on state and an off state; and command means triggered by said switch when said switch is in its on state for generating a command signal for receipt by said host computer, wherein an action taken by said computer upon receipt of said command is dependent on said state of said switch.

3. A device as recited in claim 5 wherein said remote unit is a foot pedal unit.

4. A device as recited in claim 1 wherein said mechanical linkage includes at least five joints, wherein a configuration of said joints allows said stylus to spin freely about an axis extending through the length of said stylus while all of said other joints remain fixed in position, and a sensor for sensing said spin and providing a signal describing said spin to said host computer.

5. A device as recited in claim 4 wherein three joints of said mechanical linkage closest to said stylus control said orientation of said stylus, said orientation being variable by a user while a position of a point on said stylus remains fixed.

6. A device as recited in claim 1 further comprising a button provided on said stylus, said button generating a command signal for receipt by said host computer when said button is pressed by said user.

7. A method for interactively interfacing a user and a computer display apparatus, comprising the steps of:

providing a stylus having a pencil-like configuration that allows writing-like manipulations between fingers of said user;

coupling to said stylus a mechanical linkage coupled to a fixed surface for supporting said stylus while allowing at least five degrees of freedom in the motion of said stylus, said mechanical linkage for providing a user the ability to manipulate the orientation and location of said stylus in three-dimensional space;

producing an interactive stylus locative signal which is responsive to and corresponding with the position and movement of the stylus at any point in time during its normal operation, said stylus locative signal providing information about the orientation and location of said stylus;

displaying a cursor on said computer display apparatus, said computer display apparatus using said stylus locative signal to position and move said cursor in accordance with the location, orientation, or movement of said stylus;

providing feedback means for generating force on said stylus in at least one of said degrees of freedom in response to force signals provided by said host computer to said mechanical linkage, said force signals correlated to information displayed on said computer display apparatus; and providing a remote unit switch capable of being in at least two states and a command device for generating a command signal representing said state of said switch and for receipt by said host computer, wherein an action taken by said computer when receiving said command signal depends on said state of said switch.

8. A method as recited in claim 7 wherein said remote unit switch is a foot pedal unit.

9. A method as recited in claim 7 wherein said mechanical linkage includes counterweights for reducing an adverse influence of gravity on said motion of said stylus when said user moves said stylus.

10. A device as recited in claim 1 wherein said mechanical linkage provides said stylus with six degrees of freedom.

11. A method as recited in claim 7 wherein said mechanical linkage provides said stylus with six degrees of freedom.

12. A method as recited in claim 7 wherein said said stylus locative signal is produced by appropriately placed sensors.

13. A device as recited in claim 1 wherein said feedback means generates a force on said stylus by generating a force on a joint included in said mechanical linkage in response to said force signals.

14. An interactive device for use in conjunction with a host computer, a computer display apparatus and a fixed surface, comprising:

a stylus that can be grasped and manipulated by a user;

a mechanical linkage coupled to a fixed surface and coupled to said stylus for supporting said stylus while allowing a plurality of degrees of freedom in the motion of said stylus;

a sensor coupled to said mechanical linkage for sensing a location of said stylus and providing a stylus locative signal to a computer display apparatus, said stylus locative signal providing information about said orientation and location of said stylus for use by said computer display apparatus to manipulate an image displayed by said computer display apparatus in accordance with said location of said stylus, said image including a computer cursor having a position controlled by said location of said stylus;

a feedback device for generating a force in at least one of said plurality of degrees of freedom of said stylus in response to a stylus force signal provided by said host computer to said interactive device, said force signal being output to said feedback device when said computer cursor interacts with other images displayed on said computer display apparatus; and a user actuated switch capable of being in a least two states and a command device for generating a command signal for receipt by said host computer, said command signal representing a state of said switch and being received by said host computer, wherein an action taken by said computer when receiving said command signal depends on said state of said switch.

15. An interactive device as recited in claim 14 wherein when said cursor displayed on said computer display apparatus moves into a different image displayed on said computer display apparatus, a force signal is output and a force is generated in at least one of said plurality of degrees of freedom.

16. An interactive device as recited in claim 14 wherein said mechanical arm linkage allows six degrees of freedom in the motion of said stylus.

17. A system for controlling an electromechanical interface apparatus manipulated by a user, the system comprising:

a host computer system for receiving a microprocessor input control signal and for providing high-level host commands, wherein said host computer system modifies a displayed process in response to said microprocessor input control signal and in proportion to a position or orientation of a physical object manipulated by a user;

a microprocessor separate from said host computer system for receiving said high-level host commands from said host computer system and providing a microprocessor output control signal;

an actuator coupled to said physical object and controlled by said microprocessor output control signal and providing a force along a degree of freedom to said user manipulable physical object in response to said microprocessor output control signal;

a sensor for tracking motion of said manipulable physical object along said degree of freedom and for outputting a locative signal which is responsive to and represents the position or orientation of said physical object, wherein said microprocessor is responsive to said locative signal, derives said microprocessor input control signal at least in part from said locative signal, and sends said microprocessor input control signal to said host computer system;

local memory separate from memory of said host computer system, said local memory comprising non-volatile memory;

program instructions stored in said non-volatile memory for enabling communication between said microprocessor and said host computer system and for decoding at least one of said high level host commands; and a plurality of command routines stored in said local memory at least one of said command routines allowing said microprocessor to control said actuator in accordance with at least one of said decoded high-level commands, and at least one of said command routines reporting said input control signal to said host computer in accordance with at least one of said decoded high-level commands.

18. A system as recited in claim 17 wherein said microprocessor selects one of said command subroutines as instructed by said host commands and controls said actuator by following instructions of said selected command subroutine.

19. A system as recited in claim 17 wherein said physical object can be moved by said user in a plurality of degrees of freedom, and wherein said system further comprises, for each of said plurality of degrees of freedom, an actuator for providing a force along a degree of freedom of said object, and a sensor for detecting motion of said object in said degree of freedom.

20. A system as recited in claim 17 wherein said force provided by said actuator is a resistive force to motion of said physical object in said degree of freedom.

21. A system as recited in claim 17 further comprising a serial interface coupled between said host computer and said microprocessor for outputting said host command from said host computer system to said microprocessor and for receiving said microprocessor input control signal at said host computer system from said microprocessor.

22. A system as recited in claim 17 wherein said host computer system displays images on a visual output device and manipulates said images in accordance with said position of said physical object.

23. A system as recited in claim 17 further comprising a peripheral switch coupled to said microprocessor for providing input signals to said microprocessor when a user manipulates said peripheral switch, wherein said microprocessor reports a state of said switch to said host computer system, said state causing said host computer system to modify said displayed process.

24. A method for interfacing motion of an object with a host computer system, the method comprising the steps of:
providing a physical object having a degree of freedom;
sensing positions of said physical object along said degree of freedom with a sensor and producing electrical sensor signals therefrom;
utilizing a microprocessor separate from said host computer system to receive said electrical sensor signals, provide said electrical sensor signals to said host computer system, and to receive host commands from said host computer system;
creating a force on said object along said degree of freedom by using said microprocessor and said host commands to control an actuator coupled to said physical object;
providing a non-volatile memory device coupled to and provided local to said microprocessor and being accessible by said microprocessor; and
providing program instructions stored in said non-volatile memory for enabling communication between said microprocessor and said host computer system and for allowing said microprocessor to control said actuators in accordance with force commands provided by said host computer system.

25. A method as recited in claim 24 wherein said microprocessor and said host computer system are coupled together by a serial communication interface.

26. A method as recited in claim 24 wherein said microprocessor provides processor commands to said actuator in accordance with a processor subroutine selected in accordance with said host commands and stored on a memory device coupled to said microprocessor.

27. A method as recited in claim 24 wherein said host computer system controls and displays visual images on a visual output apparatus in accordance with said positions of said physical object.

28. A method as recited in claim 27 wherein said physical object includes a stylus that can be moved by said user in at least five degrees of freedom.

29. A method as recited in claim 24 further comprising sending a peripheral command to said microprocessor from a peripheral input device, wherein said microprocessor sends said peripheral command to said host computer system.

30. An interface device manipulated by a user and communicating with a host computer system displaying visual images on a screen, said host computer system updating said visual images in response to input signals, said interface device comprising:
a microprocessor, separate from said host computer system, for communicating with said host computer system via a communication interface by receiving a host command from said host computer system, said microprocessor being controlled by software instructions stored on a memory device coupled to said microprocessor, said software instructions enabling said communication between said host computer system and said microprocessor;
a user object movable in a degree of freedom by a user and being physically contacted by said user;
an actuator electrically coupled to said microprocessor for applying a force along a degree of freedom to said user object in accordance with a processor command from said microprocessor, said processor command being derived from said host command, wherein said software instructions on said memory device includes a routine that allows said microprocessor to control said actuator in accordance with said host command; and
a sensor for detecting a position of said user object along said degree of freedom and outputting sensor information that is included in said input signals received by said host computer system, said sensor information including information representative of said position of said user object.

31. An interface device as recited in claim 30 wherein said sensor is electrically coupled to said microprocessor, wherein said sensor outputs said sensor information to said microprocessor, and wherein said microprocessor sends said input signals that include said sensor information to said host computer system.

32. An interface device as recited in claim 31 wherein said microprocessor is operative to receive said sensor information from said sensor in accordance with a processor routine selected in accordance with said host command and stored in said memory device.

33. An interface device as recited in claim 31 wherein said user object is movable in at least two degrees of freedom.

34. An interface device as recited in claim 31 wherein said communication interface includes a serial interface.

35. An interface device as recited in claim 31 wherein said actuator applies a resistive force along said degree of freedom to said user object.

36. A system as recited in claim 17 wherein said command routines are stored in said non-volatile memory.

37. A system as recited in claim 23 wherein said reporting of said state of said switch to said host computer system is controlled by at least one of said command subroutines.

38. A system as recited in claim 37 wherein a peripheral switch coupled to said microprocessor for providing input signals to said microprocessor when a user manipulates said peripheral switch, wherein said microprocessor reports a state of said switch to said host computer system, said state causing said host computer system to modify said computer-implemented process, and wherein said reporting of said state by said microprocessor is controlled by one or more of said command routines.

39. An interface device as recited in claim 26 wherein said microprocessor is provided on board an interface device coupled to said physical object, said interface device being physically separate from said host computer system and coupled to said host computer system by a bus.

40. An interface device as recited in claim 24 wherein said program instructions include a processor routine to instruct said microprocessor to monitor and decode said host commands from said host computer system and wherein said subroutine is one of a plurality of available routines which said microprocessor calls and executes in accordance with said host command.

41. An interface device as recited in claim 30 wherein said microprocessor is provided on board said interface device.

42. An interface device as recited in claim 41 wherein said microprocessor monitors and decodes said host commands from said host computer system and wherein said routine in said memory device is one of a plurality of available routines which said microprocessor calls and executes in accordance with said host command.

43. An interface device as recited in claim 42 further comprising a peripheral switch electrically coupled to said microprocessor and capable of being in one of two states, and wherein said host command to said microprocessor causes said microprocessor to execute code in said memory that allows said microprocessor to report said state of said peripheral switch to said host computer system.

44. An interface device as recited in claim 42 wherein said host command causes said microprocessor to call and execute a routine to set communication parameters for communication between said microprocessor and said host computer.

45. An interface device as recited in claim 42 wherein said host command causes said microprocessor to call and execute a routine to read said sensor information and provide said input signals to said host computer.

46. An interface device as recited in claim 42 wherein said user object is coupled to a mechanical linkage having a plurality of joints, and wherein said host command causes said microprocessor to call and execute a routine to set a force on a joint of said mechanical linkage.

47. An electromechanical interface apparatus manipulated by a user for interfacing with a host computer system, said host computer system receiving a microprocessor input control signal and providing high-level host commands, wherein said host computer system modifies a displayed process in response to said microprocessor input control signal and based on a position or orientation of a physical object manipulated by said user, the interface apparatus comprising:

a microprocessor separate from said host computer system for receiving said high-level host commands from said host computer system and providing a microprocessor output control signal;

an actuator coupled to said physical object and controlled by said microprocessor output control signal and providing a force along a degree of freedom to said user manipulable physical object in response to said processor output control signal;

a sensor for tracking motion of said manipulable physical object along said degree of freedom and for outputting a locative signal which is responsive to and represents the position or orientation of said physical object, wherein said microprocessor is responsive to said locative signal, derives said microprocessor input control signal at least in part from said locative signal, and sends said microprocessor input control signal to said host computer system;

local memory separate from memory of said host computer system, said memory comprising non-volatile memory;

program instructions stored in said non-volatile memory for enabling communication between said microprocessor and said host computer system and for decoding said high level host commands; and a plurality of command routines stored in said local memory, at least one of said command routines allowing said microprocessor to control said actuator in accordance with at least one of said decoded host commands, and at least one of said command routines reporting said input control signal to said host computer in accordance with at least one of said decoded host commands.

48. An electromechanical interface apparatus as recited in claim 47 wherein said microprocessor input control signal received by said host computer system includes information indicative of which host command said microprocessor is responding to.

49. An electromechanical interface apparatus as recited in claim 47 wherein said host command causes said microprocessor to repeatedly send said microprocessor input control signal to said host computer system until a different host command is received by said microprocessor to cease sending said microprocessor input control signal.

50. An electromechanical interface apparatus as recited 47 claim, wherein said microprocessor can compute a position and orientation of said physical object using kinematic equations and said locative signal.

* * * * *